US010816696B2

(12) United States Patent
Jin et al.

(10) Patent No.: US 10,816,696 B2
(45) Date of Patent: Oct. 27, 2020

(54) CHIP WITH BEAMFORMING NETWORK BASED ON PHOTONIC CRYSTAL RESONANT CAVITY TREE STRUCTURE AND FABRICATION METHOD THEREOF

(71) Applicant: 38th Research Institute Of China Electronics Technology Group Corp., Hefei, Anhui (CN)

(72) Inventors: Xueming Jin, Anhui (CN); Naidi Cui, Anhui (CN); Jin Guo, Anhui (CN); Junbo Feng, Anhui (CN); Yuankui Hu, Anhui (CN); Heng Zhao, Anhui (CN); Li Jin, Anhui (CN); Erdong Chen, Anhui (CN)

(73) Assignee: 38th Research Institute Of China Electronics Technology Group Corp., Hefei (CN)

(*) Notice: Subject to any disclaimer, the term of this patent is extended or adjusted under 35 U.S.C. 154(b) by 0 days.

(21) Appl. No.: 16/663,234

(22) Filed: Oct. 24, 2019

(65) Prior Publication Data
US 2020/0081155 A1 Mar. 12, 2020

Related U.S. Application Data

(63) Continuation of application No. PCT/CN2018/086292, filed on May 10, 2018.

(30) Foreign Application Priority Data

Apr. 28, 2018 (CN) .......................... 2018 1 0404504

(51) Int. Cl.
*G02B 6/12* (2006.01)
*G02B 6/122* (2006.01)
(Continued)

(52) U.S. Cl.
CPC .............. *G02B 1/005* (2013.01); *B82Y 20/00* (2013.01); *G02B 6/125* (2013.01);
(Continued)

(58) Field of Classification Search
CPC ......... G02B 6/13; G02B 6/125; G02B 6/1225
See application file for complete search history.

(56) References Cited

U.S. PATENT DOCUMENTS 7,772,606 B2 * 8/2010 Cao ....................... H01S 5/2232
257/98
2002/0191905 A1 12/2002 Prather
(Continued)

FOREIGN PATENT DOCUMENTS

CN 102323641 A 1/2012
CN 104570404 A 4/2015

*Primary Examiner* — Sung H Pak
(74) *Attorney, Agent, or Firm* — Wayne & Ken, LLC; Tony Hom

(57) ABSTRACT

The application relates to radars, and provides a chip with a beamforming network based on a photonic crystal resonant cavity tree structure and a fabrication method thereof. The chip includes a beamforming network layer, including an incidence coupling grating, first to Nth photonic crystal resonant cavity combinations, first to (N+1)th optical waveguides and an emergence coupling grating which are successively connected; branches of each photonic crystal resonant cavity combination is an integral multiple of that of the previous photonic crystal resonant cavity combination, and two photonic crystal resonant cavity combinations are connected by an optical waveguide.

7 Claims, 6 Drawing Sheets

(51) Int. Cl.
*G02B 6/125* (2006.01)
*G02B 6/13* (2006.01)
*G02B 6/34* (2006.01)
*G02B 6/42* (2006.01)
*G02B 1/00* (2006.01)
*B82Y 20/00* (2011.01)
*G02F 1/01* (2006.01)

(52) U.S. Cl.
CPC ....... *G02B 6/12007* (2013.01); *G02B 6/1225* (2013.01); *G02B 6/13* (2013.01); *G02B 6/34* (2013.01); *G02B 6/4214* (2013.01); *G02F 1/0147* (2013.01); *G02B 2006/1213* (2013.01); *G02B 2006/12107* (2013.01); *G02B 2006/12166* (2013.01)

(56) References Cited

U.S. PATENT DOCUMENTS

2014/0141999 A1* 5/2014 Chakravarty ........ G01N 21/255 506/9
2020/0018714 A1* 1/2020 Carr ................... G01N 27/4141

\* cited by examiner

CHIP WITH BEAMFORMING NETWORK BASED ON PHOTONIC CRYSTAL RESONANT CAVITY TREE STRUCTURE AND FABRICATION METHOD THEREOF

CROSS-REFERENCE TO RELATED APPLICATIONS

This application is a continuation of International Patent Application No. PCT/CN2018/086292, filed on Oct. 5, 2018, which claims the benefit of priority from Chinese Application No. 201810404504.8, filed on Apr. 28, 2018. The entire contents of the aforementioned applications, including any intervening amendments thereto, are incorporated herein by reference.

TECHNICAL FIELD

The present invention relates to chips with network, more particularly, to a chip with beamforming network based on a photonic crystal resonant cavity structure and a fabrication method thereof.

BACKGROUND OF THE INVENTION

Compared to mechanical scanning radar, phased array radar, which changes the direction of beam steering by changing the phase of the radar signal, has a more flexible beam steering, a higher precision, a higher scanning efficiency, a better self-adaptation and anti-interference performance, and higher reliability. Furthermore, the phased array radar is required to provide a wider instantaneous bandwidth to improve the resolution, recognition ability and the anti-interference ability thereof due to the development of military technology and the emergence of various new weapons. Meanwhile, the radar array needs to be smaller, lighter and has lower power consumption to integrate more antenna elements in a limited space, payload weight, and power limit, so that the performance of the phased array radar is improved.

The above problems can be effectively solved by the photonic crystals and the associated delay devices thereof from the following aspects. Firstly, a qualitative leap for radar instantaneous bandwidth can be achieved by substituting the traditional electrical signals with light as a medium to transform the electrical beamforming network system to the optical beamforming network system. Secondly, the size, weight and the power consumption of the radar antenna system can be greatly reduced, due to the chip for achieving the optical true time delay formed by the optical waveguide and photonic crystal resonant cavity is micron-sized, where the basic size of the photonic crystal resonant cavity is within the order of magnitude of the wavelength. Thus, the foundations of the development of the new high performance and high integration radar and the airborne/spaceborne phased array radar are provided.

In the prior art, a plurality of chips are paralleled for the wider adjustment range and more scanning interfaces, which comprise a photonic crystal waveguide with a corresponding input and scanning interface connected to both ends and an even number of photonic crystal resonant cavities that are symmetrically arranged on both sides of the photonic crystal waveguide, such that a large number of photonic crystal resonant cavities, as well as the corresponding regulation electrodes, are used, and the great difficulty of the adjustment of the corresponding device will be further caused.

SUMMARY OF THE INVENTION

A chip with beamforming network based on a photonic crystal resonant cavity tree structure is provided by the present invention targeting the deficiencies of the prior art, which spares photonic crystal resonant cavities and reduces the difficulty of adjusting the device.

A chip with beamforming network based on a photonic crystal resonant cavity tree structure, comprising a beamforming network layer, where the beamforming network layer comprises an incidence coupling grating, a first photonic crystal resonant cavity combination, a second photonic crystal resonant cavity combination, . . . , an Nth photonic crystal resonant cavity combination, a first optical waveguide, a second waveguide, . . . , an Nth optical waveguide, an (N+1)th optical waveguide, and an emergence coupling grating.

The second photonic crystal resonant cavity combination comprises $B_1$ branches . . . and the Nth photonic crystal resonant cavity combination comprises $B_{N-1}$ branches.

The incidence coupling grating is connected to the first photonic crystal resonant cavity combination via the first optical waveguide, and the first photonic crystal resonant cavity combination is connected to the second optical waveguide having $B_1$ branches at an end away from the first photonic crystal resonant cavity combination, and the branches of the second optical waveguide is connected with the respective branches of the second photonic crystal resonant cavity combination in a one-to-one fashion, . . . , each branch of the (N−1)th photonic crystal resonant cavity combination is connected with an Nth optical waveguide having $B_{N-1}$ at an end away from the (N−1)th photonic crystal resonant cavity combination, and the branches of the Nth optical waveguide is connected with the branches of the Nth photonic crystal resonant cavity combination which is connected to the emergence coupling grating via the (N+1)th optical waveguide in a one-to-one fashion.

Where N is a positive integer that is equal to or greater than 2; and $B_1$-$B_{N-1}$ are positive integers, and $B_{N-1}=2^N-1$.

In some embodiments, the first photonic crystal resonant cavity combination and each branch of the second to Nth photonic crystal resonant cavity combinations each comprise a photonic crystal waveguide and an even number of photonic crystal resonant cavities symmetrically distributed on both sides of the photonic crystal waveguide; and the first optical waveguide is connected with the photonic crystal waveguide of the first photonic crystal resonant cavity combination, and both ends of the second to Nth optical waveguides are connected with the photonic crystal waveguide of the corresponding photonic crystal resonant cavity combinations.

Where N is a positive integer that is equal to or greater than 2.

In some embodiments, the photonic crystal resonant cavities of the second to Nth photonic crystal resonant cavity combinations have the same branch structure.

Where N is a positive integer that is equal to or greater than 2.

In some embodiments, $B_{N-1}$ is a positive even number.

In some embodiments, the chip further comprises an electrode layer comprising a heating chrome electrode surrounded the photonic crystal resonant cavity, and an anode and cathode which are covered with a gold film are connected to the heating chrome electrode via a lead.

In some embodiments, a silicon substrate layer and a silicon dioxide buried layer are further provided, where the silicon substrate layer, the silicon dioxide buried layer and the beamforming network layer are made of an SOI material.

Where an SOI substrate comprises a top silicon layer and a bottom silicon substrate, and a silicon dioxide buried layer therebetween.

In a second aspect, provided is a method for fabricating the chip with beamforming network based on a photonic crystal resonant cavity tree structure, comprising:

1) fabricating the optical waveguide, the photonic crystal resonant cavity, the incidence coupling grating and the emergence coupling grating on the SOI substrate by photolithography;

2) fabricating the heating chrome electrode on the SOI substrate in step 1 by thermal evaporation and lift-off and 3) depositing a gold film on surfaces of an anode and a cathode of the heating chrome electrode in step 2 by thermal evaporation and lift-off.

Furthermore, step 1 further comprises:

1.1) cleaning the SOI substrate comprising a top silicon layer with a thickness of 220 nm, a dioxide buried layer with a thickness of 3 µm and a bottom silicon substrate with a thickness of 600 µm;

1.2) applying a photoresist film with a thickness of 2-3 nm onto the SOI substrate;

1.3) soft baking the SOI substrate covered with the photoresist film in an oven;

1.4) exposing the photoresist film under a deep ultraviolet;

1.5) transferring a pattern of a mask onto the exposed photoresist film by developing and hardening;

1.6) fabricating a photonic crystal resonant cavity and a main structure of the chip with beamforming network based on a photonic crystal resonant cavity tree structure on a surface of the SOI substrate by plasma etching, where the etching depth is 220 nm;

1.7) removing the photoresist film on the surface of the plasma-etched SOI substrate to obtain the main structure of the chip with beamforming network based on the photonic crystal resonant cavity tree structure, that is, the silicon substrate, the silicon dioxide buried layer and an optical waveguide structure layer which are distributed from up to down.

Where the SOI substrate comprises a top silicon layer and a bottom silicon substrate, and a silicon dioxide buried layer therebetween.

Furthermore, step 2 further comprises:

2.1) applying a photoresist film with a thickness of 100 nm onto the SOI substrate obtained in step 1 as a main structure of the chip with beamforming network based on the photonic crystal resonant cavity tree structure;

2.2) soft baking the photoresist film;

2.3) exposing the photoresist film;

2.4) transferring a pattern of a mask onto the photoresist film by developing and hardening;

2.5) depositing a chrome film with a thickness of 100 nm by thermal evaporation;

2.6) lifting off the chrome film on a region without electrode pattern to obtain a chrome electrode.

Furthermore, step 3 further comprises:

3.1) applying a photoresist film with a thickness of 200 nm onto the chrome electrode obtained in step 2.6;

3.2) soft baking the photoresist film;

3.3) exposing the photoresist film;

3.4) transferring a pattern of a mask onto the photoresist film by developing and hardening;

3.5) depositing a gold film with a thickness of 200 nm on the anode and the cathode by thermal evaporation.

The benefits of the chip with beamforming network based on a photonic crystal resonant cavity tree structure of the present invention are described as follows. A large number of the photonic crystal resonant cavities are spared and the difficulty of adjusting the photonic crystal resonant cavity device is reduced. The second photonic crystal resonant cavity combination comprises $B_1$ branches connected with the second to Nth photonic crystal resonant cavity combinations, and from the third photonic crystal resonant cavity combination, the branch number of each photonic crystal resonant cavity combination is the multiple of that of the previous photonic crystal resonant cavity combination, so with the same amount of scanning interfaces (i.e., the emergence coupling grating), the sharing of photonic crystal resonant cavity combinations before the Nth photonic crystal resonator combination is realized.

Where N and $B_1$ are positive integers that are equal to or greater than 2.

BRIEF DESCRIPTION OF THE DRAWINGS

In order to further illustrate the embodiments of the present invention or the technical solutions in the prior art, the accompanying drawings used in the embodiments or the description of the prior art will be briefly described below. Obviously, the accompanying drawings in the following description are only some embodiments of the present invention, and other drawings can be obtained according to these drawings by those skilled in the art without any creative work.

REFERENCE NUMERALS

Figure 1:
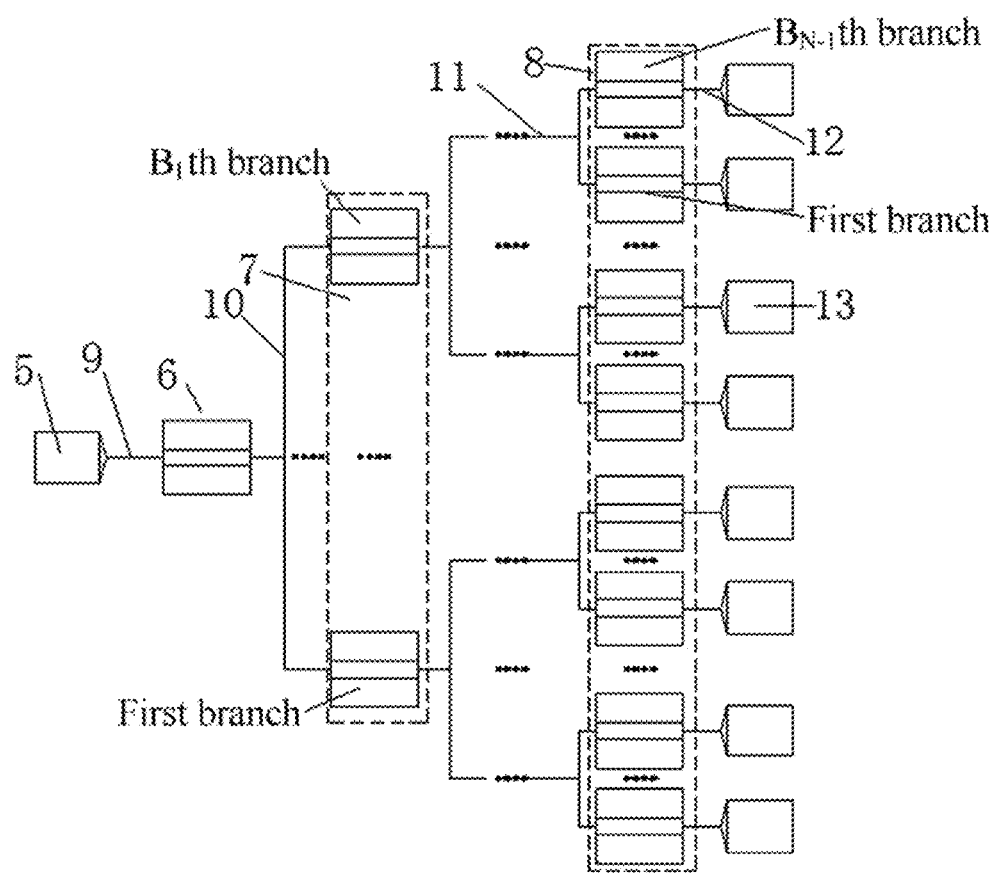
FIG. 1 is a schematic diagram of a beamforming network layer of a chip with beamforming network based on a photonic crystal resonant cavity tree structure according to the present invention.

1, silicon substrate layer; 2, silicon dioxide buried layer; 3, beamforming network layer; 4, electrode layer; 5, incidence coupling grating; 6, first photonic crystal resonant cavity combination; 7, second photonic crystal resonant cavity combination; 8, Nth photonic crystal resonant cavity combination; 9, first optical waveguide; 10, second optical waveguide; 11, Nth optical waveguide; 12, (N+1)th optical waveguide; 13, emergence coupling grating; 14, photonic crystal waveguide; 15, anode; 16, cathode; 17, photonic crystal resonant cavity; 18, heating chrome electrode.

DETAILED DESCRIPTION OF EMBODIMENTS

The technical solutions in the embodiments of the present invention will be clearly and completely described in conjunction with the accompanying drawings, from which the objects, technical solutions and advantages of the present invention will be clearer. The described embodiments are only a part of the embodiments of the present invention. All other embodiments obtained by those skilled in the art based on the embodiments of the present invention without creative efforts are within the scope of the present invention.

EXAMPLE 1

As shown in FIGS. 1-5, when N is 3, the first photonic crystal resonant cavity combination comprises two photonic crystal resonant cavities 17; the second photonic crystal resonant cavity combination 7 comprises two branches, and each branch comprises 4 photonic crystal resonant cavities 17; and the third photonic crystal resonant cavity combination 8 comprises 4 branches, and each branch comprises two photonic crystal resonant cavities 17. It should be noted that all the photonic crystal resonant cavities 17 correspond to the same electrode layer 4, which are not fully shown in FIGS. 1-3 and 5. Based on the deficiencies of the prior art, the present embodiment provides a chip with beamforming network based on a photonic crystal resonant cavity tree structure, comprising a beamforming network layer 3 that comprises an incidence coupling grating 5, a first photonic crystal resonant cavity combination 6, a second photonic crystal resonant cavity combination 7, . . . , the Nth photonic crystal resonant cavity combination 8, a first optical waveguide 9, a second optical waveguide 10, . . . , the Nth optical waveguide 11, the (N+1)th optical waveguide 12 and an emergence coupling grating 13.

The second photonic crystal resonant cavity combination 7 comprises $B_1$ branches, . . . , and the Nth photonic crystal resonant cavity combination 8 comprises $B_{N-1}$ branches.

The incidence coupling grating 5 is connected to the first photonic crystal resonant cavity combination 6 via the first optical waveguide 9, and the first photonic crystal resonant cavity combination 6 is connected to the second optical waveguide 10 having $B_1$ branches on an end away from the first photonic crystal resonant cavity combination 6, and the branches of the second optical waveguide 10 is connected with the respective branches of the second photonic crystal resonant cavity combination 7 in a one-to-one fashion, . . . , each branch of the (N−1)th photonic crystal resonant cavity combination is connected with an Nth optical waveguide 11 having $B_{N-1}$ branches at an end away from the (N−1)th photonic crystal resonant cavity combination 8, and the branches of the Nth optical waveguide is connected with the branches of the Nth photonic crystal resonant cavity combination 8 which is connected to the emergence coupling grating 13 via the (N+1)th optical waveguide 12 in a one-to-one fashion.

It should be noted that N is a positive integer that is equal to or greater than 2; and $B_1$-$B_{N-1}$ are positive integers, and $B_{N-1}=2^N-1$.

Figure 2:
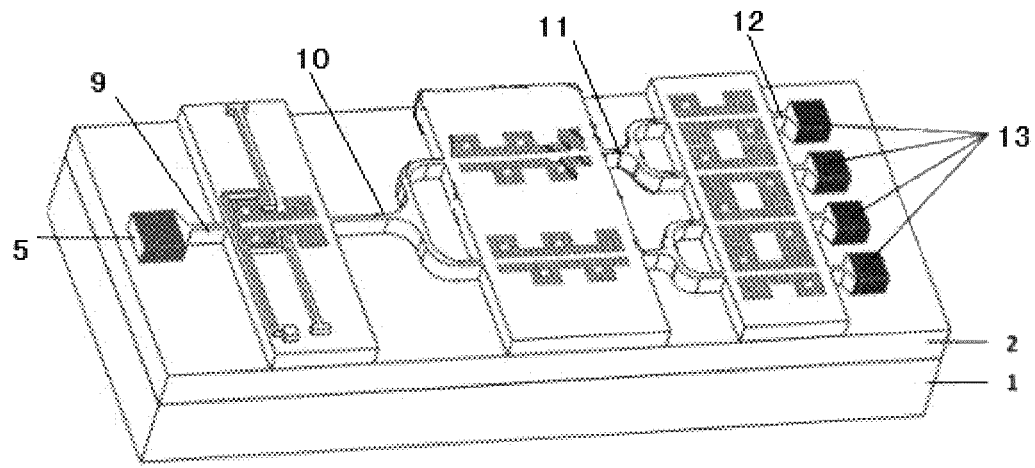
FIG. 2 is a perspective view of the chip with beamforming network based on the photonic crystal resonant cavity tree structure according to an embodiment of the present invention.
Figure 3:
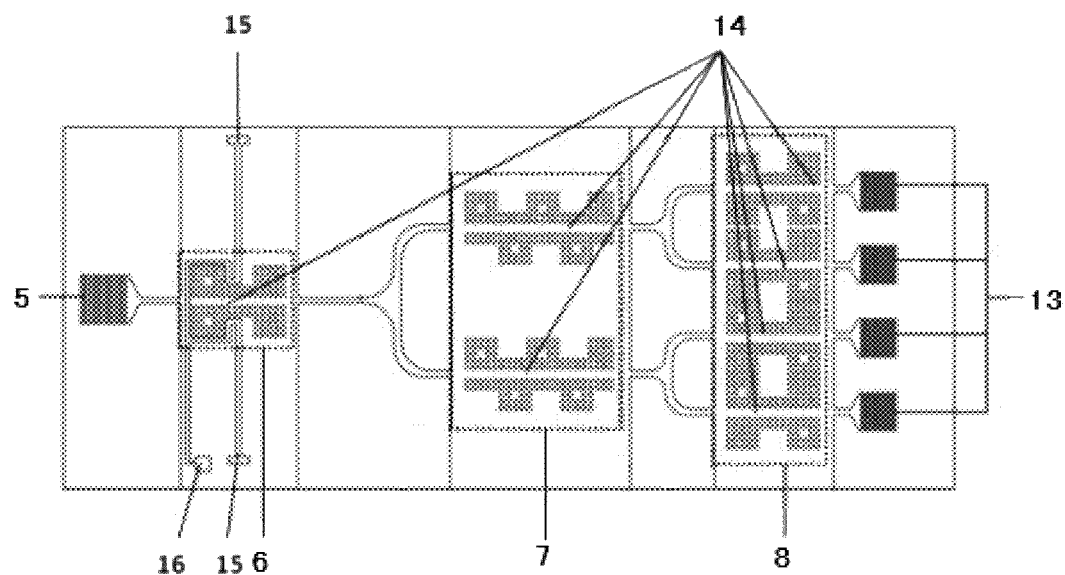
FIG. 3 is a top view of FIG. 2.
Figure 4:
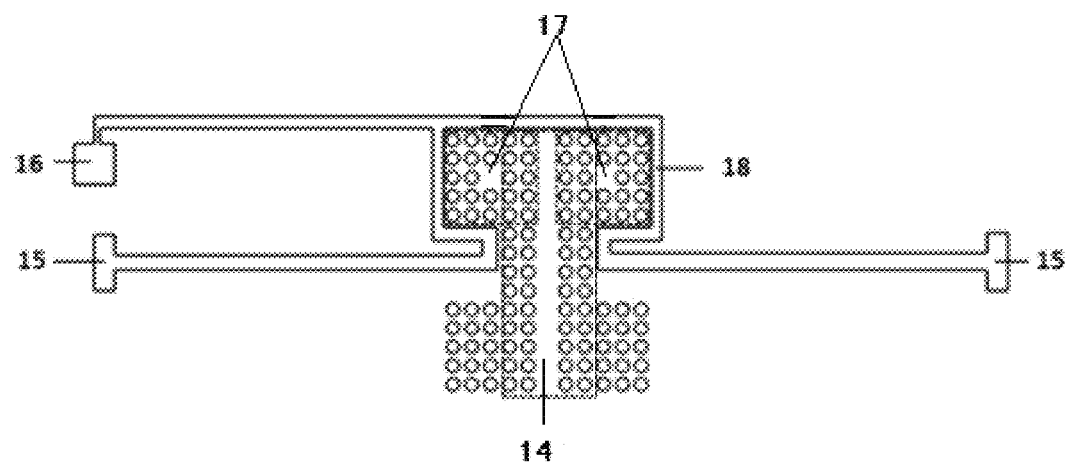
FIG. 4 is a top view of an electrode layer of the chip with the chip with beamforming networking based on the photonic crystal resonant cavity tree structure according to the present invention.
Figure 5:
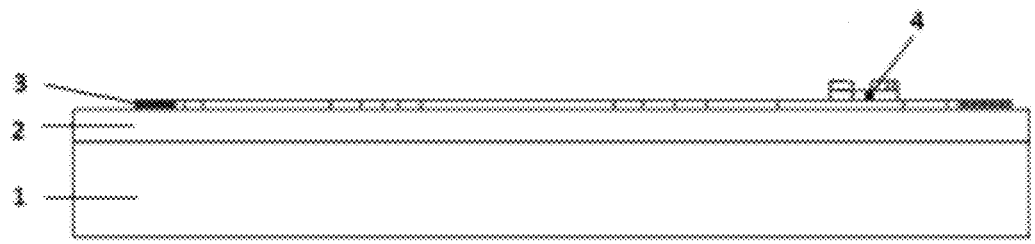
FIG. 5 is a side view of FIG. 2.
Figure 6A:
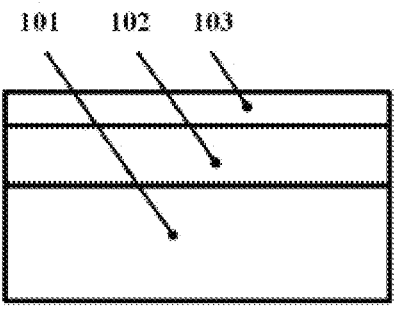
FIGS. 6A-F are schematic diagrams showing a flow chart of an SOI substrate processed by steps 1.1, 1.2, 1.4, 1.5, 1.6 and 1.7.
Figure 6B:
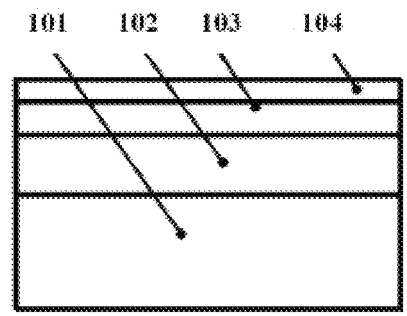
Figure 6C:
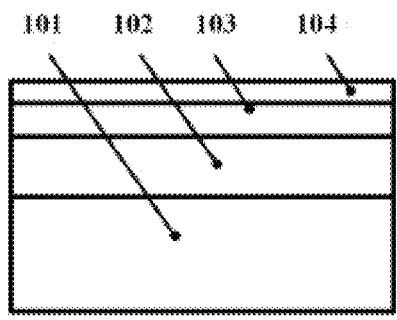
Figure 6D:
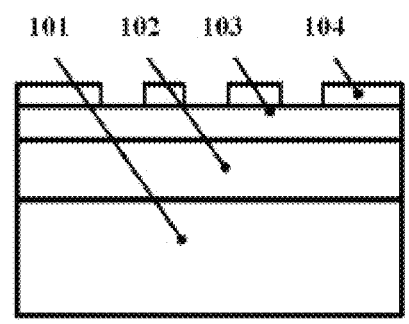
Figure 6E:
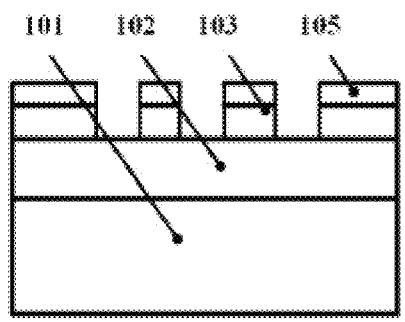
Figure 6F:
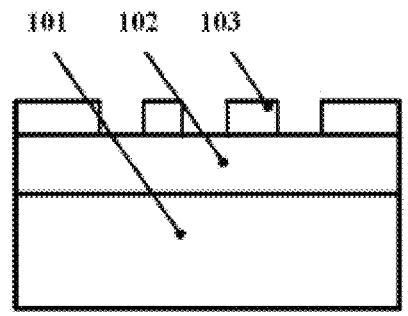
Figure 7A:
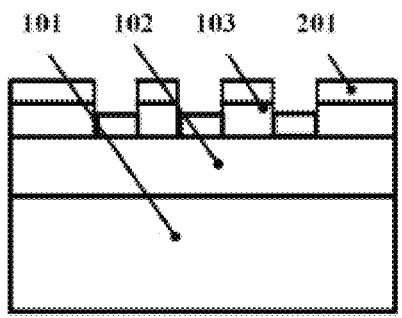
FIGS. 7A-E are schematic diagrams showing a flow chart of the SOI substrate processed by steps 2.1, 2.3, 2.4, 2.5 and 2.6.
Figure 7B:
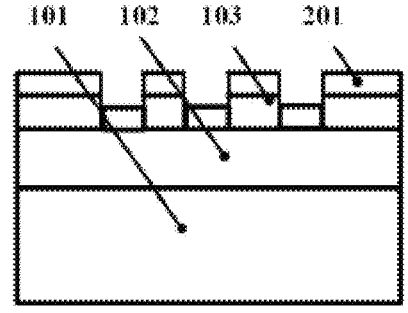
Figure 7C:
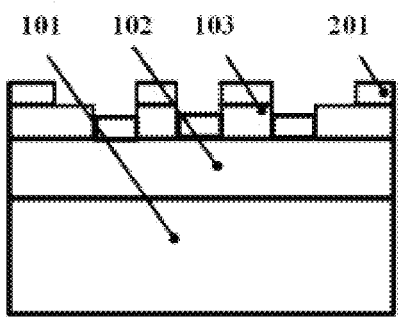
Figure 7D:
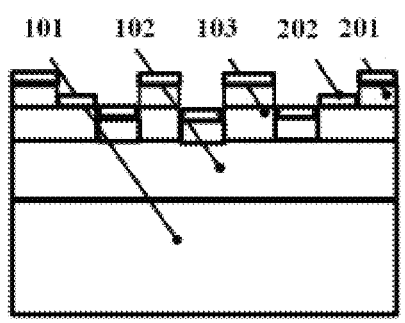
Figure 7E:
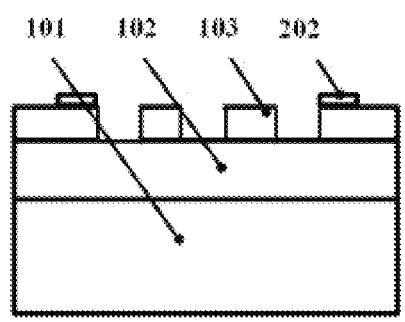

In the above embodiment, the second photonic crystal resonant cavity combination 7 comprises $B_1$ branches connected to the second to Nth photonic crystal resonant cavity combination, and from the third photonic crystal resonant cavity combination, the branch number of each photonic crystal resonant cavity combination is the multiple of that of the previous photonic crystal resonant cavity combination, so with the same amount of scanning interfaces (i.e., the emergence coupling grating 13), the sharing of photonic crystal resonant cavity combinations before the Nth photonic crystal resonator combination 8 is realized, such that a large number of the photonic crystal resonant cavities 17 are spared and the difficulty of adjusting the photonic crystal resonant cavity device is reduced. As shown in FIGS. 2-3, 32 photonic crystal resonant cavities 17 are needed in the prior art to adjust 4 scanning interfaces (i.e. 4 emergence coupling gratings) and 8 photonic crystal resonant cavities 17 at the same time, whereas only 18 photonic crystal resonant cavities 17 are needed in the present invention, which saves 14 photonic crystal resonant cavities.

In an embodiment, the first photonic crystal resonant cavity combination 6 and each branch of the second to Nth photonic crystal resonant cavity combinations each comprise a photonic crystal waveguides 14 and an even number of the photonic crystal resonant cavities 17 symmetrically distributed on both sides of the crystal waveguide; the first optical waveguide 9 is connected with the photonic crystal waveguide 14 of the first photonic crystal resonant cavity combination 6, and both ends of the second to Nth optical waveguides are connected with the photonic crystal waveguide 14 of the corresponding photonic crystal resonant cavity combinations.

It should be noted that N is a positive integer that is equal to or greater than 2.

In the embodiment, the photonic crystal resonant cavities 17 of each photonic crystal resonant cavity combination are symmetrically distributed on both sides of the photonic crystal waveguide 14 to ensure the continuous regulation of the optical delay.

The photonic crystal resonant cavities of the second to Nth photonic crystal resonant cavity combinations have the same branch structure; where N is a positive integer that is equal to or greater than 2.

The embodiment ensures each light beam exited from the emergence coupling grating 13 is regulated by the same amount of the photonic crystal resonant cavity combinations after entering the incidence coupling grating 5 and passing through the first to Nth photonic crystal resonant cavity combinations and the first to Nth optical waveguides. The retardation of each light beam exited from the emergence coupling grating 13 is regulated by adjusting the photonic crystal resonant cavities 17 of each branch of the Nth photonic crystal resonant cavity combination 8 when the retardation of each branch of the second to (N−1)th photonic crystal resonant cavity combinations are the same, such that the retardation of each light exited from the emergence coupling grating 13 could be increased or decreased successively along the direction perpendicular to the (N+1)th optical waveguide 12, thereby enabling the radar to perform bidirectional scanning.

The $B_{N-1}$ is a positive integer, since the emergence coupling grating 13 of radar should be an even number, the branch number of the Nth photonic crystal resonant cavity combination 8 is limited to M times that of the Nth photonic crystal resonant cavity combination, where M is an even number, so that the use of extra photonic crystal resonant cavity combinations (i.e. photonic crystal resonant cavities) is spared.

In this embodiment, the chip further comprises an electrode layer 4 comprising the heating chrome electrode 18 surrounded the photonic crystal resonant cavity 17, and the anode 15 and the cathode 16 which are connected to the heating chrome electrode 18 are covered with a gold film on the surface thereof.

In the embodiment, the retardation of the light is regulated by heating the photonic crystal resonant cavity 17 with the heating chrome electrode 18; and the gold film can effectively increase the conductivity of the anode 15 and the cathode 16.

In some embodiments, a silicon substrate layer 1 and a silicon dioxide buried layer 2 are further provided, where the silicon substrate layer 1, the silicon dioxide buried layer 2 and the beamforming network layer 3 are made of an SOI material; and the SOI substrate comprises a top silicon layer 103 and a bottom silicon substrate 101, and a silicon dioxide buried layer 102 therebetween.

EXAMPLE 2

Figure 8:
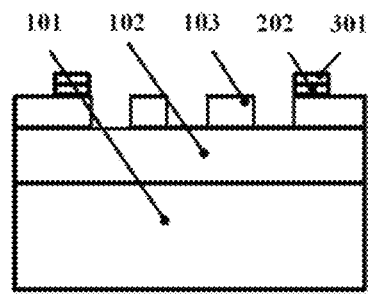
FIG. 8 is a schematic diagram showing an electrode covered with a gold film.

As shown in the FIGS. 6-8, in this embodiment, illustrated is a method for fabricating the chip with beamforming network based on a photonic crystal resonant cavity tree structure, which comprises:

1) the optical waveguide, photonic crystal resonant cavity, the incidence coupling grating and the emergence coupling grating are fabricated on the SOI substrate by photolithography;

2) the heating chrome electrode is fabricated on the SOI substrate in the step 1 by thermal evaporation and lift-off; and 3) the gold film is deposited on the surface of an anode and a cathode of the heating chrome electrode in step 2 by thermal evaporation and lift-off.

Step 1 comprises the following steps:

1.1) the SOI substrate comprising a top silicon layer 103 with a thickness of 220 nm, a silicon dioxide buried layer 102 with a thickness of 3 μm and a thick bottom silicon substrate 101 with a thickness of 600 μm is cleaned;

1.2) a photoresist film 104 with a thickness of 2-3 nm is applied onto the SOI substrate;

1.3) the SOI substrate covered with the photoresist film is put into an oven to soft bake;

1.4) the photoresist film 104 is exposed under a deep ultraviolet;

1.5) a pattern of a mask is transferred onto the exposed photoresist film 104 by developing and hardening;

1.6) a photonic crystal resonant cavity and a main structure of the chip with beamforming network based on a photonic crystal resonant cavity tree structure is fabricated on a surface of the SOI substrate by plasma etching, where the etching depth is 220 nm;

1.7) the photoresist film on the surface of the plasma-etched SOI substrate is removed, so that the main structure of the chip with beamforming network based on the photonic crystal resonant cavity tree structure is obtained, that is, the silicon substrate 101, the silicon dioxide buried layer 102 and an optical waveguide structure layer 103 which are distributed from up to down;

The SOI substrate comprises a top silicon layer 103 and a bottom silicon substrate 101, and a silicon dioxide buried layer 102 therebetween.

Step 2 further comprises the following steps:

2.1) a photoresist film 201 with a thickness of 100 nm is applied onto the SOI substrate obtained in step 1.7 as the main structure of the chip with beamforming network based on the photonic crystal resonant cavity tree structure;

2.2) the photoresist film is soft baked;

2.3) the photoresist film 201 is exposed;

2.4) a pattern of a mask is transferred onto the photoresist film by developing and hardening;

2.5) a thin film of chrome film with a thickness of 100 nm is deposited by the thermal evaporation;

2.6) the chrome electrode 202 is obtained by lifting off the chrome film on a region without electrode pattern;

The SOI substrate comprises a top silicon layer 103 and a bottom silicon substrate 101, and a silicon dioxide buried layer 102 therebetween.

Step 3 further comprises the following steps:

3.1) a photoresist film with a thickness of 200 nm is applied onto the chrome electrode obtained in step 2.6;

3.2) the photoresist film is soft baked;

3.3) the photoresist film is exposed;

3.4) the pattern of the mask is transferred onto the photoresist film by developing and hardening;

3.5) a gold film 301 with a thickness of 200 nm is deposited on the anode and the cathode by the thermal evaporation.

Conclusion

1. The second photonic crystal resonant cavity combination comprises $B_1$ branches connected with the second to Nth photonic crystal resonant cavity combinations, and from the third photonic crystal resonant cavity combination, the branch number of each photonic crystal resonant cavity combination is the multiple of that of the previous photonic crystal resonant cavity combination, so with the same amount of scanning interfaces (i.e., the emergence coupling grating 13), the sharing of photonic crystal resonant cavity combinations before the Nth photonic crystal resonator combination is realized, such that a large number of the photonic crystal resonant cavities 17 are spared and the difficulty of adjusting the photonic crystal resonant cavity device is reduced. The N and $B_1$ are positive integers that are equal to or greater than 2.

2. The number of the emergence coupling grating 13 of radar should be even, so the branch number of the Nth photonic crystal resonant cavity combination 8 is limited to M times the branch number of the Nth photonic crystal resonant cavity combination, where M is an even number, so that the use of extra photonic crystal resonant cavity combinations (i.e. photonic crystal resonant cavities) are spared. N is a positive integer that is equal to or greater than 2.

3. Each light beam exited from the emergence coupling grating 13 is ensured to be regulated by the same amount of the photonic crystal resonant cavity combinations after entering the incidence coupling grating 5 and passing the first to Nth photonic crystal resonant cavity combinations and the first to Nth optical waveguides; the retardation of each light beam exited from the emergence coupling grating 13 is regulated by adjusting the photonic crystal resonant cavities 17 of each branch of the Nth photonic crystal resonant cavity combination 8 when the retardation of each branch of the second to (N−1)th photonic crystal resonant cavity combinations are the same, such that the retardation of each light exited from the emergence coupling grating 13 could be increased or decreased successively along the direction perpendicular to the (N+1)th optical waveguide 12, thereby enabling the radar to perform bidirectional scanning. N is a positive integer that is equal to or greater than 2.

It should be noted that relational terms in the present invention such as first and second are merely used to distinguish one entity or operation from another entity or operation, and do not necessarily require or imply any actual relationship or order between such entities or operations. Furthermore, the term "comprise" or any other variations thereof is intended to encompass a non-exclusive inclusion, such that a process, method, article, or device that comprises a plurality of elements comprises not only those elements but also other elements that are not explicitly listed, or elements that are inherent to such a process, method, article, or device. An element defined by the phrase "comprising a . . . " without further limitation does not exclude the existence of additional identical elements in the process, method, article or device comprising the element.

The embodiments are only used to illustrate the technical solutions of the present invention, and are not intended to limit the scope of the present invention. Although the present invention has been described in detail with reference to the foregoing embodiments, it should be understood that modifications, equivalent replacements of the technical solutions can be made by those of ordinary skill in the art without departing from the spirit and scope of the present invention.

We claim:

1. A chip with beamforming network based on a photonic crystal resonant cavity tree structure, comprising: a beamforming network layer, wherein the beamforming network layer comprises an incidence coupling grating, a first photonic crystal resonant cavity combination, a second photonic crystal resonant cavity combination, an Nth photonic crystal resonant cavity combination, a first optical waveguide, a second waveguide, an Nth optical waveguide, an (N+1)th optical waveguide, and an emergence coupling grating;

the second photonic crystal resonant cavity combination comprises $B_1$ branches, and the Nth photonic crystal resonant cavity combination comprises $B_{N-1}$ branches;

the incidence coupling grating is connected to the first photonic crystal resonant cavity combination via the first optical waveguide, and the first photonic crystal resonant cavity combination is connected to the second optical waveguide having $B_1$ branches at an end away from the first photonic crystal resonant cavity combination, and the branches of the second optical waveguide is connected with the respective branches of the second photonic crystal resonant cavity combination in a one-to-one fashion, each branch of the (N−1)th photonic crystal resonant cavity combination is connected with an Nth optical waveguide having $B_{N-1}$ branches at an end away from the (N−1)th photonic crystal resonant cavity combination, and the branches of the Nth optical waveguide is connected with the respective branches of the Nth photonic crystal resonant cavity combinationwhich is connected to the emergence coupling grating through the (N+1)th optical waveguide in a one-to-one fashion;

wherein N is a positive integer that is equal to or greater than 2; $B_1$–$B_{N-1}$ are positive integers, and $B_{N-1}=2^N-1$;

the first photonic crystal resonant cavity combination and each branch of the second to Nth photonic crystal resonant cavity combinations comprise a photonic crystal waveguide and an even number of photonic crystal resonant cavities symmetrically distributed on both sides of the photonic crystal waveguide; and the first optical waveguide is connected with the photonic crystal waveguide of the first photonic crystal resonant cavity combination, and both ends of the second to Nth optical waveguides are connected with the photonic crystal waveguide of the corresponding photonic crystal resonant cavity combinations.

2. The chip of claim 1, wherein the photonic crystal resonant cavities of the second to Nth photonic crystal resonant cavity combinations have the same branch structure.

3. The chip of claim 1, wherein $B_{N-1}$ is a positive even number.

4. The chip of claim 1, wherein the chip further comprises an electrode layer, comprising a heating chrome electrode surrounded the photonic crystal resonant cavity, and an anode and a cathode which are covered with a gold film are connected to the heating chrome electrode via a lead.

5. A method for fabricating the chip of claim 1, comprising:
1) fabricating the optical waveguide, the photonic crystal resonant cavities,the incidence coupling grating and the emergence coupling grating on an SOI substrate by photolithography;
2) fabricating the heating chrome electrode on the SOI substrate obtained in step 1 by thermal evaporation and lift-off; and
3) depositing a gold film on surfaces of an anode and a cathode of the heating chrome electrode obtained in step 2 by thermal evaporation and lift-off;
wherein the SOI substrate comprises a top silicon layer and a bottom silicon substrate, and a silicon dioxide buried layer therebetween.

6. The method of claim 5, wherein step 2 comprises:
2.1) applying a photoresist film with a thickness of 100 nm onto the SOI substrate obtained in step 1 as a main structure of the chip with beamforming network based on the photonic crystal resonant cavity tree structure;
2.2) soft baking the photoresist film;
2.3) exposing the photoresist film;
2.4) transferring a pattern of a mask onto the photoresist film by developing and hardening;
2.5) depositing a chrome film with a thickness of 100 nm by thermal evaporation; and
2.6) lifting off the chrome film on a region without electrode pattern to obtain a chrome electrode.

7. The method of claim 6, wherein step 3 comprises:
3.1) applying a photoresist film with a thickness of 200 nm onto the chrome electrode fabricated in step 2.6;
3.2) soft baking the photoresist film;
3.3) exposing the photoresist film;
3.4) transferring a pattern of a mask onto the photoresist film by developing and hardening; and
3.5) depositing a gold film with a thickness of 200 nm on the anode and cathode by thermal evaporation.

* * * * *